April 26, 1955
J. P. KIEL, JR
2,706,938
CONVERGENCE FINDER FOR THREE-DIMENSIONAL CAMERAS
Filed Aug. 11, 1953
2 Sheets-Sheet 1
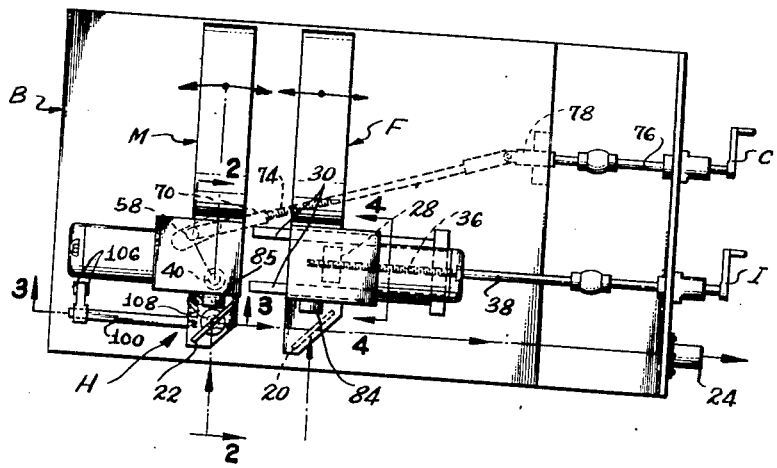
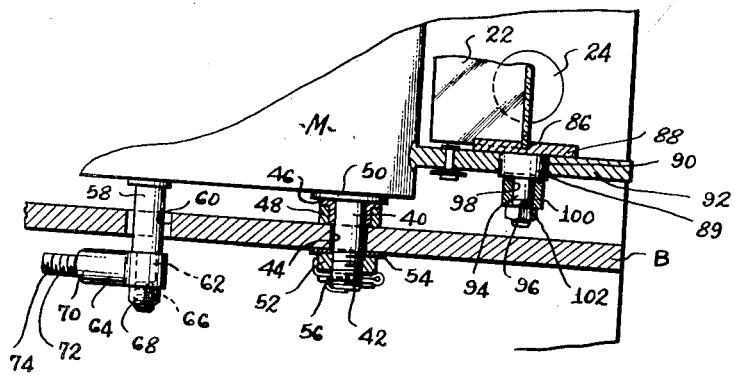
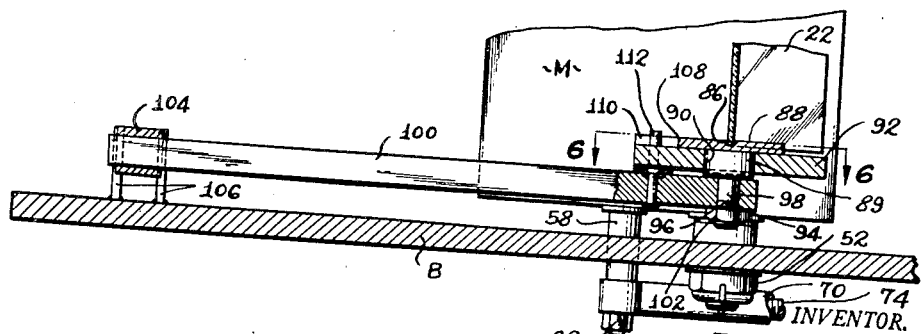
INVENTOR.
JOHN P. KIEL JR.
BY Fulwider, Mattingly & Babcock
Attorneys April 26, 1955
J. P. KIEL, JR
2,706,938
CONVERGENCE FINDER FOR THREE-DIMENSIONAL CAMERAS
Filed Aug. 11, 1953
2 Sheets-Sheet 2
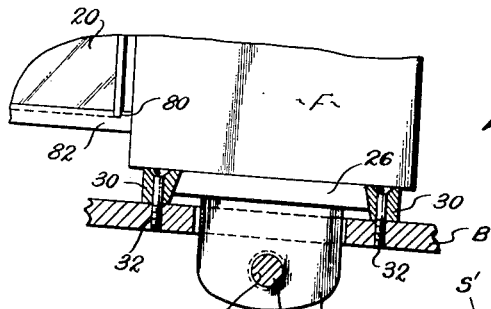
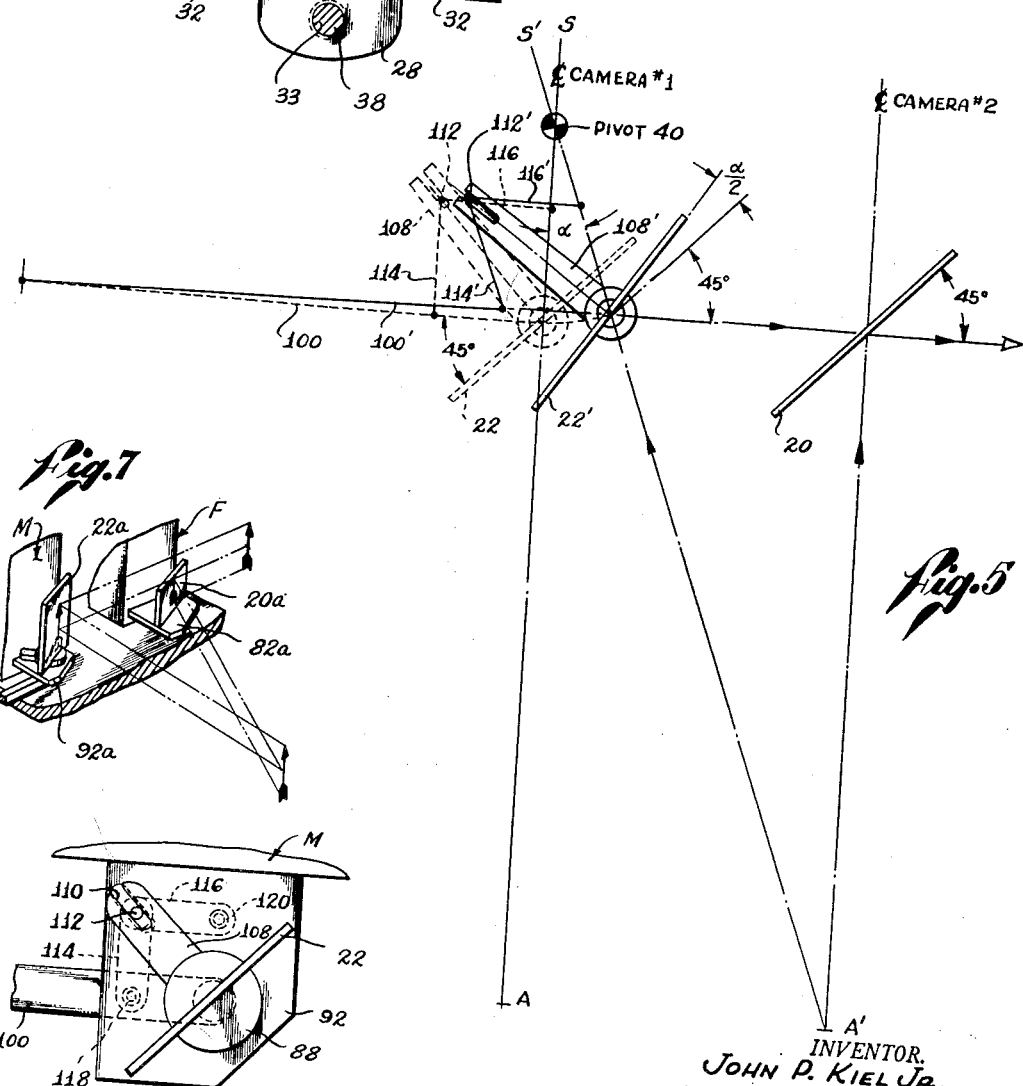
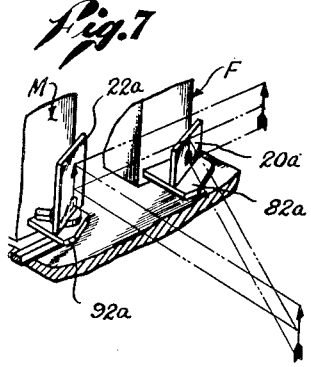
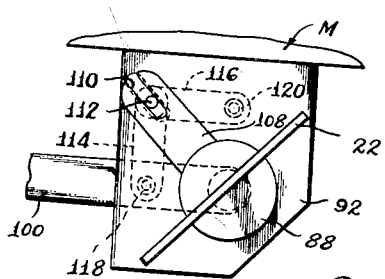
INVENTOR.
JOHN P. KIEL JR.
BY Fulwider Mattingly & Babcock
Attorneys

United States Patent Office 2,706,938
Patented Apr. 26, 1955

2,706,938

CONVERGENCE FINDER FOR THREE-DIMENSIONAL CAMERAS

John P. Kiel, Jr., Van Nuys, Calif., assignor to Edward Furer, Burbank, Calif.

Application August 11, 1953, Serial No. 373,501

5 Claims. (Cl. 95—18)

The present invention relates generally to the field of photography and more particularly to an improved convergence finder for use with a pair of three-dimensional cameras.

In filming three-dimensional motion pictures or in taking three-dimensional television programs, a pair of cameras mounted in side-by-side relationship are normally utilized, which cameras are operated in unison so as to provide a related pair of images which cooperate in affording a stereoscopic image. It is common practice to mount the cameras upon a wheeled carriage commonly termed a "dolly" whereby such cameras may be moved relative to the subject being photographed. Where the dolly is moved during the taking of a scene, a so-called "dolly shot" results. When taking a dolly shot, it is advisable that the two cameras always remain converged on the principal subject being photographed in order that a clear picture will result. This is likewise true where the subject or subjects move relative to the cameras. Prior to the development of the present invention, it was extremely difficult to obtain an indication as to whether or not the pair of cameras were actually in convergence. The conventional manner of providing such an indication requires that workmen using tape measures, or the like, step in front of the cameras before each scene and make accurate measurements for subsequent use by the cameraman when taking the scene. This procedure is not only time-consuming, but also often results in error. When such error occurs, although it is generally possible to retake the scene, such retakes result in added expense. Furthermore, if it is desired to take live television programs utilizing a pair of three-dimensional cameras, no retakes are possible.

It is a major object of the present invention to provide a novel convergence finder for use with a pair of three-dimensional cameras.

Another object of the invention is to provide a convergence finder which may be constructed as part of the camera supporting structure in the form of a complete self-contained unit that does not require the use of any other elements between the camera and the subject being photographed.

A further object of the invention is to provide a convergence finder which is foolproof in operation and which does not require the services of an operator having any special training.

It is another object of the present invention to provide a convergence finder which is simple in design and rugged of construction whereby it may have a long service life.

It is another object to provide a convergence finder which is especially adapted for use with a pair of cameras having means for adjusting the interocular distance therebetween.

An additional object is to provide a convergence finder of the aforedescribed nature having but a few working parts whereby it may be constructed of readily obtainable materials and manufactured at a comparatively low cost.

These and other objects of the present invention will become apparent from the following detailed description of a preferred embodiment thereof, when taken in conjunction with the appended drawings wherein:

Figure 1 is a top plan view of a pair of three-dimensional cameras equipped with a convergence finder embodying the present invention;

Figure 2 is an enlarged fragmentary, vertical sectional view taken on line 2—2 of Figure 1;

Figure 3 is an enlarged fragmentary vertical sectional view taken on line 3—3 of Figure 1;

Figure 4 is an enlarged fragmentary vertical sectional view taken on line 4—4 of Figure 1;

Figure 5 is a diagrammatic view showing the mode of operation of said convergence finder;

Figure 6 is an enlarged fragmentary horizontal sectional view taken on line 6—6 of Figure 3; and Figure 7 is a fragmentary perspective view showing a modification of said convergence finder.

Referring to the drawings and particularly to Figure 1 thereof, there is shown a base member B whereon are mounted a pair of cameras F and M; camera F being fixed against rotation relative to the base member, and camera M being pivotable about a vertical axis relative to the base member and to camera F. The base member B is adapted to be mounted upon a camera dolly (not shown) whereby the cameras may be moved relative to a subject or scene being photographed. During movement of the dolly toward or away from such subject or scene, the cameras are adapted to be kept in convergence by manipulation of a crank C mounted at one side of the base member. Another crank I mounted forwardly of crank C on the same side of the base member is adapted to effect movement of the fixed camera F toward or away from the movable camera M so as to vary the interocular distance therebetween.

The preferred form of convergence finder embodying the present invention includes a first semi-reflecting, semi-transparent mirror 20 rigidly mounted at the front of the fixed camera F; a second mirror 22 mounted at the front of the movable camera M; mirror moving means H interposed between the second mirror 22 and the base member B for effecting concurrent movement of the mirror 22 in a horizontal path during pivotal movement of the movable camera M; and a sight 24 mounted at one side of the base member B. The first mirror 20 is of the semi-reflecting type while the second mirror 22 is a full reflecting type. The first mirror 20 is so located relative to the fixed camera F and the sight 24, that it will reflect images lying upon the optical axis of this camera into the sight. The mirror-moving means H is so designed that the second mirror 22 will always reflect light coming from the optical axis of the second camera through the center of the first mirror 20. The sight 24 is in exact alignment with the center of the first mirror 20. Accordingly, when the cameras are converged upon a subject located a desired distance ahead of the cameras, the operator will observe but a single image of said subject when looking into the sight 24. If the cameras are not converged, however, separate images of said subject will be seen by the operator.

With regard to a more particular description of the aforementioned device, and referring to Figures 1 and 4, the fixed camera F is rigidly secured at its underside to a wedge-shaped block 26 formed with a depending lug 28. The block 26 is slidably received between a pair of longitudinally extending guides 30 secured to the base member B, as by bolts 32. The midportion of the lug 28 is formed with a horizontal bore 33 having threads that are engaged by external threads 36 formed on a longitudinally extending crank rod 38 journalled by the base member. This crank rod 38 is keyed to the crank I so that rotation of such crank will cause the lug 28, and hence the camera F, to be moved longitudinally relative to the base member B, the direction of such longitudinal movement being determined by the direction in which the crank I is being rotated. In this way, the camera F may be moved toward or away from the movable camera M to vary the interocular distance therebetween.

As shown in Figure 2, a vertically extending pivot post 40 depends from the underside of the movable camera M, the lower part of which post is formed with external threads 42. This post 40 extends through a vertical bore 44 formed in the base member B. Bearing members 46 and 48 are interposed between the upper surface of the base member and a washer 50 carried by the underside of the camera M. A nut 52 is threaded upon the lower end of the post 40 below a washer 54, which nut is secured by a cotter pin 56.

A second vertically extending post 58 depends from the underside of the camera M rearwardly of the pivot post 40. This second post 58 extends through a slot 60 formed in the base member. The lower part of post 58 is of reduced diameter, as indicated at 62, whereby it may pivotally receive a lug 64. This lower portion is also formed with external threads 66 for receiving a nut 68 adapted to retain the lug 64 in place. The opposite end of the lug 64 is formed with a socket portion 70 having internal threads adapted for engagement with external threads 72 formed upon the free end of a rod 74. The opposite end of the rod 74 is coupled to a crank arm 76 by means of a universal joint 78. The crank arm 76 is journalled to the base member B and is keyed to the crank C. With this arrangement, rotation of the crank C will effect concurrent rotation of crank arm 76 and rod 74 whereby the latter will be threaded into or out of the socket portion 70 of the lug 64 depending upon the direction in which the crank is being rotated, in effect, shortening or lengthening the rod 74. In this manner, the camera M will be caused to rotate about the pivot post 40 upon rotation of the crank C.

Turning now to the mirrors 20 and 22 mounted in front of the cameras F and M, respectively, the first mirror 20 is flat and is coated on its front surface with a reflecting material in such a manner that the mirror is semi-reflective and semi-transmissive. This mirror is rigidly secured at its lower edge within a slot 80 formed in a forwardly extending plate 82, which plate is rigidly mounted to the front of the camera F as shown in Figure 4. It should be noted that this mirror 20 is aligned with, but spaced below, the axis of the lens 84 of camera F.

Referring to Figures 2, 3 and 6, the second mirror 22 is aligned with, but spaced below, the axis of the lens 85 of the camera M. This second mirror is rigidly secured at its lower edge within a slot 86 formed in a mirror turning element 88, which element includes a disc 89 that is journaled within a bore 90 formed in a forwardly extending plate 92 for rotation relative thereto about a vertical axis. The rear of the plate 92 is rigidly affixed to the front of the camera M. A post 94 formed with external threads 96 depends from the disc 89. This post 94 fits within a bore 98 formed at one end of a longitudinally extending rod 100 and is rotatably held therein by a nut 102. The opposite end of the rod 100 is slidably supported by a guide element or collar 104 that is in turn rigidly connected to the side of the base member B opposite the cranks C and I by means of a support 106.

As shown clearly in Figure 6, mirror turning element 88 includes a rearwardly and sidewardly extending tongue 108, which tongue is formed with a slot 110. This slot 110 slidably receives an upstanding pin 112 that serves to pivotally interconnect a pair of links 114 and 116. These links are of equal length and are pivotally connected at their distal ends by pins 118 and 120, respectively, to the rod 100 and to the plate 92, respectively. The distal ends of these links are located at equal distances from the axis of rotation of element 88.

With this arrangement, and referring particularly to Figure 5, if it is assumed that the cameras F and M are first photographing a subject or scene that is disposed at some distance therefrom, whereby the optical axes of the lenses 84 and 85 thereof are disposed in a generally parallel relationship, should it become desirable to shift to a close-up of the subject, it is necessary that the camera M be pivoted in a counterclockwise direction about the pivot post so that its optical axis will intersect the optical axis of camera F at the location of the subject A'. Thus, the optical axis of the lens 85 must be moved from line AS to line A'S'. During such pivotal movement of the camera M in a counter-clockwise direction, the rod 100 will be pulled to the right relative to the collar 104 by virtue of the connection of this rod to the mirror turning element 88, and hence to the plate 92. The disc 89 of the mirror turning element will also be rotated in a counter-clockwise direction relative to the plate 92 during such movement, the exact number of degrees through which the disc 89 and hence the mirror 22 moves being controlled by the links 114 and 116. Thus, since the links 114 and 116 are of equal length and have their distal ends mounted at equal distances from the axis of rotation of the mirror turning element 88, the center line of the tongue 108 will always bisect the angle between the links.

When the optical axis of the camera F is rotated from the line AS to the line A'S', the links are moved from their dotted position of Figure 5 to their solid line, primed, position thereof, and the angle between the links will be reduced or changed. Since the tongue 108 always bisects this angle between the links, changing this angle by a certain amount will cause the tongue to move through an angle of just half this amount. In this connection, it should be noted that the rod 100 is of such a length that it may be considered as being perpendicular to the optical axis of fixed camera F at all times.

Accordingly, since the second mirror 22 is rigidly affixed to the tongue, it will be rotated through an angle equal to half the angle through which the movable camera M is rotated relative to the base member B and the fixed camera F. This arrangement is necessary in order that the second mirror 22 will always reflect light, originating upon the optical axis of the movable camera, through the first mirror 20 and the sight 24. In this regard, it will be apparent that any change in angularity of a flat mirror will concurrently effect a change in angularity of the light reflected therefrom through double the number of degrees through which the mirror is rotated. This is true because the angle of reflection of the light being equal to the angle of incidence thereof, the sum of these angles must be added to the angle through which the mirror is rotated.

Although the mirror moving means H shown and described herein, has proved very satisfactory in actual use, it will be apparent that other means for effecting the desired movement of the second mirror 22 may be utilized without departing from the scope of the present invention. In this regard, while the rod 100, 114 and 116, tongue 108 and upstanding pin 112 function very satisfactorily as a bisector linkage in permitting the second mirror 22 to turn through exactly one-half the angle through which the movable camera is turned, other forms of bisector linkages may be employed for this purpose.

It should be observed that while ideally the second mirror 22 should pivot about the pivotal axis of the movable camera M, practical constructional difficulties may preclude such arrangement. By spacing this mirror 22 slightly forwardly of the movable camera's pivotal axis in the manner disclosed herein, however, very satisfactory results are achieved.

In operation, the operator may be disposed adjacent the cranks I and C with his eye looking into the sight 24. If but a single image of the subject located at the point of focus of the cameras is visible in the sight, the cameras are in convergence. If, however, a double image of this subject is visible, the operator may turn the crank C until the two images are in register. The cameras will then be in convergence.

During a dolly shot when the cameras are being moved toward or away from a subject whereby the point of convergence is constantly changing, the operator may maintain the cameras in convergence by continually rotating the crank C so as to keep a single image of the subject visible in the sight. The interocular distance between the two cameras may be readily varied by manipulation of the crank I. It should be especially noted that such variation does not affect the method of operation of the convergence finder. The operator need never take his eye from the sight during adjustment of the cranks, and both of the cranks are positioned for ready access by the operator.

Referring now to Figure 7, there is shown a modification of the preferred form of convergence finder. In this modification, the fixed mirror 20a, as well as the movable mirror 22a is of the fully reflecting type. However, the fixed mirror 20a reflects only one-half of the image, such as the lower half, while the movable mirror 22a reflects the other half. Thus, each of the mirrors 20a and 22a need be only half as high as their counterparts, the mirrors 20 and 22, previously described. By vertically positioning the mirrors 20a and 22a so that both may simultaneously be viewed through the finder 24, the same effect may be obtained as in my previously described form. However, instead of seeing two complete images when the cameras are not properly converged, with this alternate form of my device, the operator will see an upper image, of half the subject, laterally displaced from a lower image of the other half of the subject.

Although there has been shown and described what is at present believed to be the preferred embodiment and one modification of the present invention, it will be apparent to those skilled in the art that various modifications and changes may be made with respect thereto without departing from the spirit of the invention or the scope of the following claims.

I claim:

1. A convergence finder for use with a fixed camera and a movable camera mounted in side-by-side relationship by a base member, said movable camera being pivotable about a vertical axis relative to said fixed camera, said finder comprising: a sight mounted by said base member; a semi-reflecting mirror mounted in line with but vertically spaced from the optical axis of said fixed camera so as to reflect images located upon said axis into said sight; a reflecting mirror mounted in line with but vertically spaced from the optical axis of said movable camera, said semi-reflecting mirror being interposed between said reflecting mirror and said sight; a mirror turning element secured to said reflecting mirror and mounted by the front of said movable camera for pivotal movement relative thereto about a vertical axis; a guide element rigidly secured to said base member; a rod rigidly affixed at one of its ends to said mirror turning element and having its opposite end disposed within said guide element; an integral tongue extending from said mirror turning element, said tongue being formed with a slot; a pair of links of equal length that are pivotally interconnected at one end, the distal ends of said links being pivotally connected to said rod and to said movable camera, respectively, at points located an equal distance from the axis of rotation of said mirror turning element; and, a pin extending from the point of interconnection of said links into said slot, said pin sliding within said slot during pivotal movement of said movable camera so as to pivot said reflecting mirror through an angle equal to half the angle through which said movable camera is being rotated whereby said reflecting mirror may constantly reflect images located upon the optical axis of said movable camera through said semi-reflecting mirror into said sight.

2. A convergence finder for use with a fixed camera and a movable camera mounted in side-by-side relationship by a base member, said movable camera being pivotable about a vertical axis relative to said fixed camera, said finder comprising: a sight mounted by said base member; a semi-reflecting mirror mounted in line with but vertically spaced from the optical axis of said fixed camera so as to reflect images located upon said axis into said sight; a reflecting mirror mounted in line with but vertically spaced from the optical axis of said movable camera, said semi-reflecting mirror being interposed between said reflecting mirror and said sight; a mirror turning element secured to said reflecting mirror and mounted by the front of said movable camera for pivotal movement relative thereto about a vertical axis; a collar rigidly mounted at the side of said base member opposite said sight; a horizontally extending rod rigidly affixed at one of its ends to said mirror turning element and having its opposite end movably disposed within said collar; an integral tongue extending rearwardly and sidewardly from said mirror turning element, said tongue being formed with a slot; a pair of horizontal links of equal length; and, an upstanding pin pivotally interconnecting one end of each of said links, the distal ends of said links being pivotally connected to said rod and to said movable camera, respectively, at points located an equal distance from the axis of rotation of said mirror turning element, said pin sliding within said slot during pivotal movement of said movable camera so as to pivot said reflecting mirror through an angle equal to half the angle through which said movable camera is being rotated whereby said reflecting mirror may constantly reflect images located upon the optical axis of said movable camera through said semi-reflecting mirror into said sight.

3. A convergence finder for use with a fixed camera and a movable camera mounted in side-by-side relationship by a base member, said movable camera being pivotable about a vertical axis relative to said fixed camera, said finder comprising: a horizontally disposed sight mounted at one side of said base member; a semi-reflecting mirror rigidly mounted in line with but vertically spaced from the optical axis of said fixed camera so as to reflect images located upon said axis into said sight; a horizontal plate secured to the front of said movable camera and formed with a vertically extending bore; a disc rotatably disposed in said bore; a mirror turning element integrally secured to the upper end of said disc, said element including a tongue that extends rearwardly and toward the side of said base member opposite said sight; a slot formed at the free end of said tongue; a reflecting mirror affixed to said mirror turning element, said mirror being disposed upon but vertically spaced from the optical axis of said movable camera; a collar rigidly mounted at the side of said base member opposite said sight; a horizontally extending rod rigidly affixed at one of its ends to said disc and having its opposite end movably disposed within said collar; a pair of horizontal links of equal length; and, an upstanding pin pivotally interconnecting one end of each of said links, the distal ends of said links being pivotally connected to said rod and to said plate at points located an equal distance from the axis of rotation of said disc, said pin sliding within said slot during pivotal movement of said movable camera so as to pivot said reflecting mirror through an angle equal to half the angle through which said movable camera is being rotated whereby said reflecting mirror may constantly reflect images located upon the optical axis of said movable camera through said semi-reflecting mirror into said sight.

4. Camera apparatus, comprising: a base member; a fixed camera mounted on said base member; a movable camera mounted by said base member for pivotal movement about a vertical axis relative to said fixed camera; crank means for effecting rotation of said movable camera; means for effecting movement of said fixed camera toward and away from said movable camera so as to vary the interocular distance therebetween; a horizontally disposed sight mounted at one side of said base member; a semi-reflecting mirror rigidly mounted in line with but vertically spaced from the optical axis of said fixed camera so as to reflect images located upon said axis into said sight; a horizontal plate secured to the front of said movable camera and formed with a vertically extending bore; a disc rotatably disposed in said bore; a mirror turning element integrally secured to the upper end of said disc, said element including a tongue that extends rearwardly and toward the side of said base member opposite said sight; a slot formed at the free end of said tongue; a reflecting mirror affixed to said mirror turning element, said mirror being disposed upon but vertically spaced from the optical axis of said movable camera; a collar rigidly mounted at the side of said base member opposite said sight; a horizontally extending rod rigidly affixed at one of its ends to said disc and having its opposite end movably disposed within said collar; a pair of horizontal links of equal length; and an upstanding pin pivotally interconnecting one end of each of said links, the distal ends of said links being pivotally connected to said rod and to said plate at points located an equal distance from the axis of rotation of said disc, said pin sliding within said slot during pivotal movement of said movable camera so as to pivot said reflecting mirror through an angle equal to half the angle through which said movable camera is being rotated whereby said reflecting mirror may constantly reflect images located upon the optical axis of said movable camera through said semi-reflecting mirror into said sight in order that said crank means may be manipulated so as to keep said images in register and thereby maintain said cameras in convergence.

5. A convergence finder for use with a fixed camera and a movable camera mounted in side-by-side relationship by a base member, said movable camera being pivotable about a vertical axis relative to said fixed camera, said finder comprising: a horizontally disposed sight mounted at one side of said base member; a first mirror rigidly mounted in line with but vertically spaced from the optical axis of said fixed camera so as to reflect an image component of a subject located upon said axis into said sight; a horizontal plate secured to the front of said movable camera and formed with a vertically extending bore; a disc rotatably disposed in said bore; a mirror turning element integrally secured to the upper end of said disc, said element including a tongue that extends rearwardly and toward the side of said base member opposite said sight; a slot formed at the free end of said tongue; a second mirror affixed to said mirror turning element, said mirror being disposed upon but vertically spaced from the optical axis of said movable camera; a collar rigidly mounted at the side of said base member opposite said sight; a horizontally extending rod rigidly affixed at one of its ends to said disc and having its opposite end movably disposed within said collar; a pair of horizontal links of equal length; and, an upstanding pin pivotally interconnecting one end of each of said links, the distal ends of said links being pivotally connected to said rod and to said plate at points located an equal distance from the axis of rotation of said disc, said pin sliding within said slot during pivotal movement of said movable camera so as to pivot said second mirror through an angle equal to half the angle through which said movable camera is being rotated whereby said second mirror may constantly reflect an image component of a subject located upon the optical axis of said movable camera into said sight, said image components appearing in alignment in said sight when said cameras are converged.

References Cited in the file of this patent

UNITED STATES PATENTS

| | | |
|---|---|---|
| 798,931 | Staal | Sept. 5, 1905 |
| 1,356,838 | Stein | Oct. 26, 1920 |
| 2,545,465 | Hough | Mar. 20, 1951 |